United States Patent [19]
Hsieh et al.

[11] Patent Number: 5,743,980
[45] Date of Patent: Apr. 28, 1998

[54] METHOD OF FABRICATING AN OPTICAL RETARDATION FILM

[75] Inventors: Ting-Chiang Hsieh, Hsinchu Hsien; Dong-Yuan Goang, Taoyuan Hsien; Ren-Long Chu, Hsinchu Hsien, all of Taiwan

[73] Assignee: Industrial Technology Research Institute, Hsin-Chu, Taiwan

[21] Appl. No.: 642,107

[22] Filed: May 2, 1996

[51] Int. Cl.⁶ ............................................. B29D 11/00
[52] U.S. Cl. .................. 156/99; 156/102; 264/1.34; 264/2.1; 264/216; 427/163.1
[58] Field of Search .................. 264/1.34, 1.36, 264/2.1, 346, 216; 156/99, 102; 427/162, 165, 163.1

[56] References Cited

U.S. PATENT DOCUMENTS

| | | | |
|---|---|---|---|
| 4,812,279 | 3/1989 | Nakagawa et al. | 264/2.1 |
| 5,042,924 | 8/1991 | Terasaki et al. | 264/1.34 |
| 5,236,635 | 8/1993 | Yoshida | 264/1.36 |
| 5,468,324 | 11/1995 | Hong | 264/2.1 |
| 5,478,518 | 12/1995 | Taketani et al. | 264/1.34 |

*Primary Examiner*—Mathieu D. Vargot

[57] ABSTRACT

A method of fabricating an optical retardation film having single axis crystal. A polymer material such as polyvinyl alcohol, polystyrene, polycarbonate, or poly methylmethacrylate dissolved in an alkyl solvent forms a polymer solution. A coating of the solution is deposited on a glass substrate by means of a spin coater. The coated substrate is heated in an oven or a heating pad to dry the polymer film. The dried film separated from the glass substrate forms the optical retardation film.

12 Claims, 7 Drawing Sheets

(a)

(b)

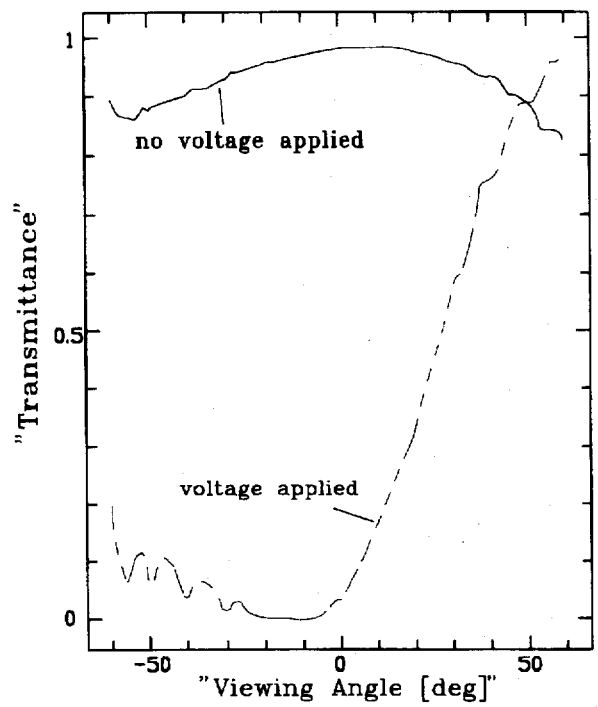
(a) vertical direction
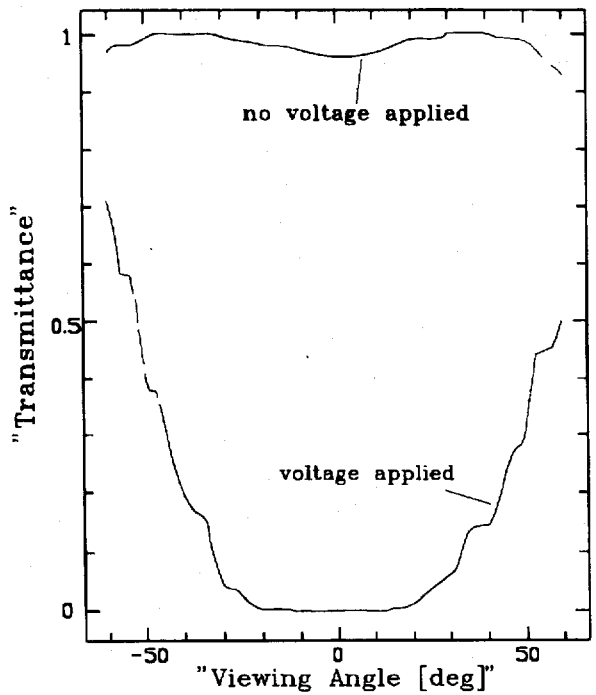
(b) horizontal direction
F I G. 6

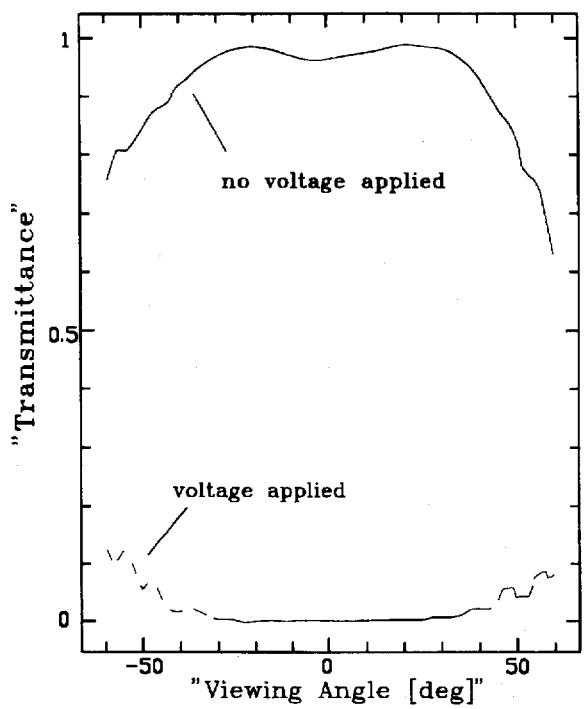
(a) vertical direction
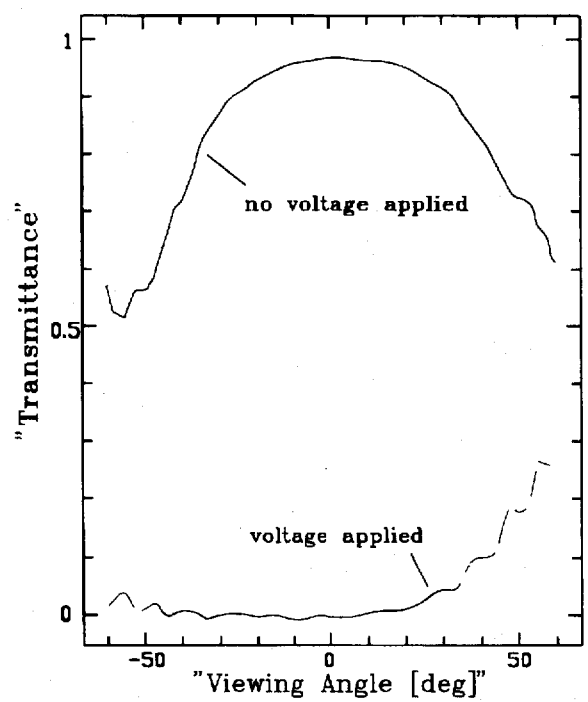
(b) horizontal direction
F I G. 7

METHOD OF FABRICATING AN OPTICAL RETARDATION FILM

FIELD OF THE INVENTION

The present invention relates to the fabrication of an optical retardation film, more specifically to the manufacturing of an optical retardation film that improves the viewing angle of a liquid crystal display (LCD) or compensates for the optical path difference of an optical device.

BACKGROUND OF THE INVENTION

Cathode ray tubes (CRT) have been widely used in display monitors. The technology of CRT has been advanced enough to produce monitors with high contrast, faithful colors and wide viewing angles that can not be matched by other types of monitors. However, the well known disadvantages such as heavy weight and bulky volume of a CRT monitor make it either inappropriate or inconvenient in many applications. Many research and development effort have been dedicated to finding a high quality display monitor that is both thin and light for the hope of replacing the CRT monitor. Flat panel displays appear to be the most promising example. Among the technology for manufacturing flat panel displays, the LCD technology is relatively well developed. The market share of LCD flat panel display monitors has also greatly increased in recent years due to their improved quality.

LCD monitors have been widely adopted in many products and have replaced CRT monitors in some applications. However, LCD monitors still can not completely take the place of CRT monitors due to their limited viewing angle. In recent years, both industrial and academic research have been very active in seeking new ways of increasing the viewing angle of an LCD display. Several different technologies such as using new methods to arrange liquid crystals or using optical retardation films to compensate for phase retardation have been presented for achieving a wider viewing angle. In particular, optical phase retarders that have been widely used for the compensation of the optical path difference in an optical device are of great interest. Okada et al. disclosed a phase retarder and a process of making it in U.S. Pat. No. 5,285,303 issued Feb. 8, 1994. Ohnishi et al. presented a liquid crystal display device with positive and negative compensating films each with its optical axis parallel to the surface in U.S. Pat. No. 5,291,323 issued Mar. 1, 1994.

The application of optical phase retarders in liquid crystal displays has also been studied and published in many literature in Japan. S. Shoji et. al of Toshiba Corporation published an article titled "Optimization of Cell Parameters in a Reflective-type Achromatic RF-ST LCD" in pages 234–235 of the proceedings of 15th Conference of Liquid Crystal Display held at Osaka University, Japan on Oct. 12–14, 1989. In pages 326–327 of the proceedings of 16th Conference of Liquid Crystal Display held at Hiroshima University, Japan on Oct. 2–4, 1990, S. Kondo et. al. presented "Optimization of Cell Parameters in an M-ST LCD" J. Hirakata also presented "The Refractive Index Dispersion of Phase Plate Film" in pages 330–331 of the same proceedings. Several patents in the area of using optical phase retarder for improving liquid crystal displays have been issued in Japan. Patent no. 2-67518 of K. Sadao issued on Mar. 7, 1990, patent no. 3-291621 and 3-291622 of I. Sigeki et. al. issued on Dec. 20, 1991, and patent no. 3-291627 of T. Yasuyuki issued on Dec. 20, 1991 are a few patents relevant to this application.

FIG. 1 shows a cross sectional view of the structure of a conventional LCD. The conventional structure comprises an upper polarizer 1, a middle structure including liquid crystal cells 2, a lower polarizer 3, and a light source 4. The decomposed structure of an LCD including the two polarizers 1, 3 and the liquid crystal cells 2 is shown in FIG. 2. To improve the viewing angle, an optical retardation film 2' may be placed between the liquid crystal cells 2 and the polarizer 3 as shown in FIG. 3. The conventional optical retarder as described in Ohnishi et al. U.S. patent is typically made by stretching a polymer film. It can not achieve the optical phase compensation characteristics of a single axis crystal. The phase compensation is subject to directional change. Therefore, when the conventional phase retarder is used in LCD display, the viewing angle is still quite limited. There is a strong demand in finding the appropriate material, composition and methods of fabrication for optical retardation films that can increase the viewing angle and contrast ratio of an LCD.

SUMMARY OF THE INVENTION

The present invention has been made to provide a method of fabricating an optical retardation film to overcome the drawback of a conventional optical phase retarder and to satisfy the above-mentioned demand.

An object of this invention is to provide a process for manufacturing optical retardation film with substantial thickness such as 10 um to 100 um. The thickness of retardation film manufactured by the process of this invention can be better controlled.

Yet another object of the invention is to present an optical retardation film that has an identical refractive index in all directions along the display plane for increasing the viewing angle and contrast ratio of an LCD.

It is another object of the present invention to provide a retardation film that can be used for the compensation of the optical path difference in optical devices.

In the present invention, the retardation film comprises a polymer material such as polyvinyl alcohol, polystyrene, polycarbonate, or poly methylmethacrylate. The material is first put in an alkyl solvent to completely dissolve the polymer and form a polymer solution. The solution is then deposited on a glass substrate by means of a spin coater. The coated substrate is heated in an oven or a heating pad to dry the polymer film. After the coated film has been dried, it can be removed from the glass substrate to form the optical retardation film. Because the solvent used in this invention is highly volatile, the process of vaporization can be eliminated to simplify the fabrication process and reduce the manufacturing cost.

The optical retardation film can also be fabricated directly over a glass substrate containing LCD cells. By first coating an adhesive layer on the glass substrate, an optical retardation film can be manufactured and adhered to the LCD cells according to the method of the present invention.

BRIEF DESCRIPTION OF THE DRAWINGS

FIG. 6(a) and 6(b) show the transmittance of a conventional TN-LCD in both vertical and horizontal directions.

FIG. 7(a) and 7(b) show the transmittance in both vertical and horizontal directions after coating a retardation film of this invention on the glass surface of LCD cells of the TN-LCD of FIG. 6.

DETAILED DESCRIPTION OF THE PREFERRED EMBODIMENTS

The fabrication of the optical retardation film of this invention starts with the selection of an appropriate material. A polymer material such as polystyrene, polycarbonate, polyvinyl alcohol and poly methylmethacrylate is dissolved in an alkyl solvent. The ratio of the polymer to the solvent is approximately 30 to 90 g of the polymer dissolved in 300 ml solvent. The fully dissolved solution is coated on the cleaned surface of a glass substrate using a spin coater. The thickness of the coated film can be controlled by the spinning speed of the spin coater. Typically, the speed ranging from 600 rpm to 1500 rpm is used to achieve different thickness of the film.

Figure 1:
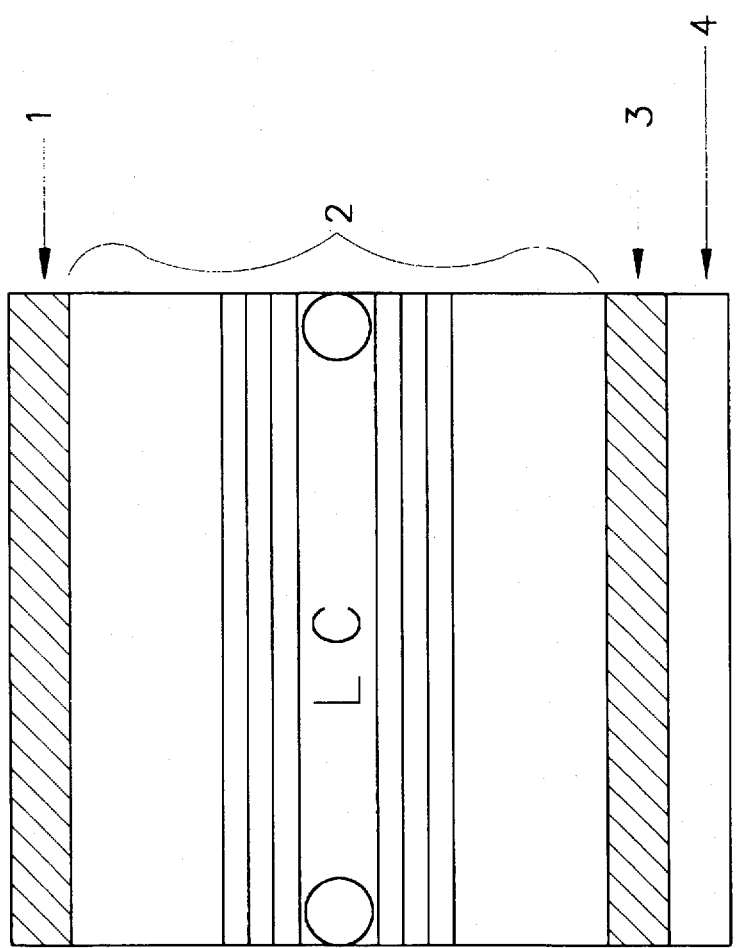
FIG. 1 shows the cross-sectional view of the structure of a conventional LCD including two polarizer layers, a liquid crystal cell layer and a light source.
Figure 2:
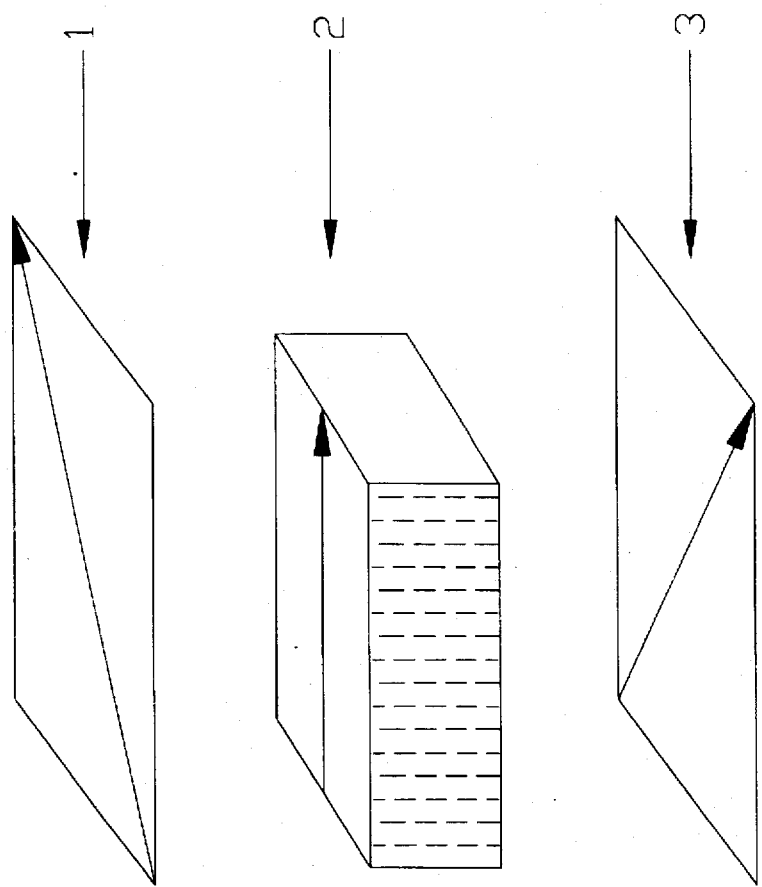
FIG. 2 illustrates the structure of the two polarizer layers and the liquid crystal cell layer for the conventional LCD of FIG. 1.
Figure 3:
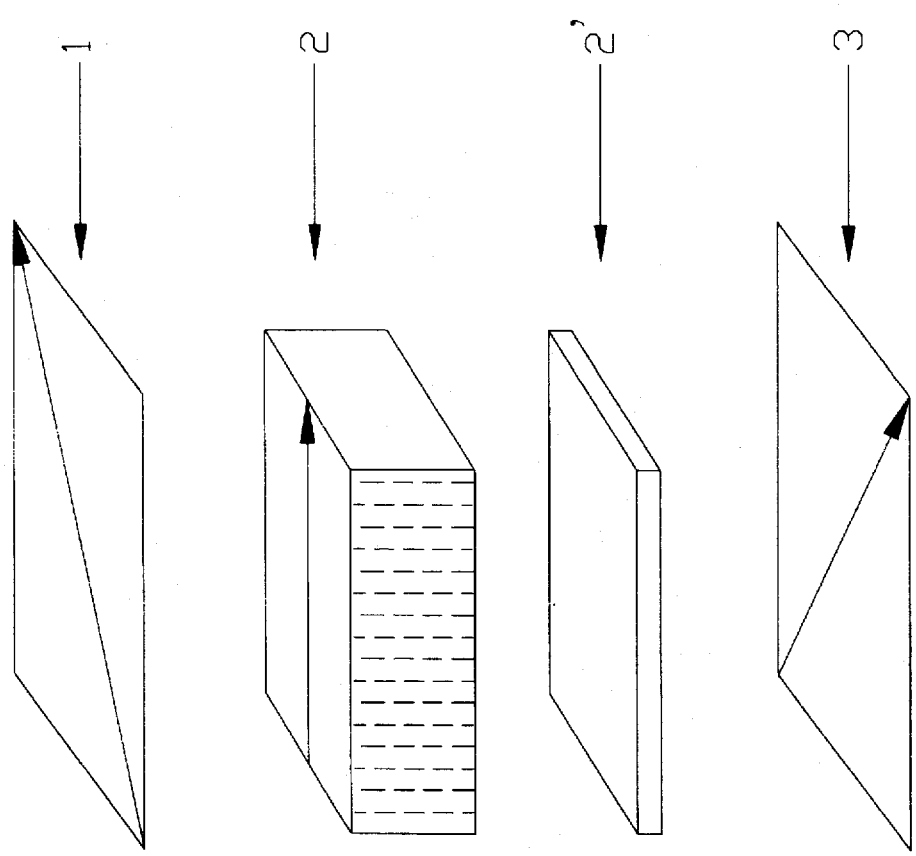
FIG. 3 shows an optical retardation film being added to the structure of the conventional LCD of FIG. 2.

The coated glass substrate is then heated in an oven or on a heating pad. The optical retardation film is thus formed on the glass substrate after the coating has been dried. The film can then be separated from the glass substrate and used for optical phase compensation. To increase the viewing angle of an LCD monitor, the optical retardation film can be inserted in the LCD as shown in FIG. 3. The film can also be used to compensate for the optical path difference in other optical devices. The thickness of the retardation film manufactured by this invention is easier to control in that it can be controlled by the spinning speed of the spin coater. Therefore, a film with substantial thickness ranging from 10 um to 100 um can be produced.

Figure 4:
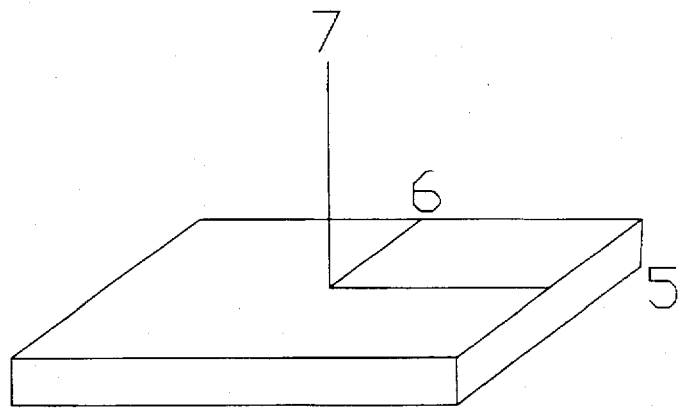
FIG. 4(a) and 4(b) show the optical retardation film and its refractive indexes of this invention.
Figure 4:
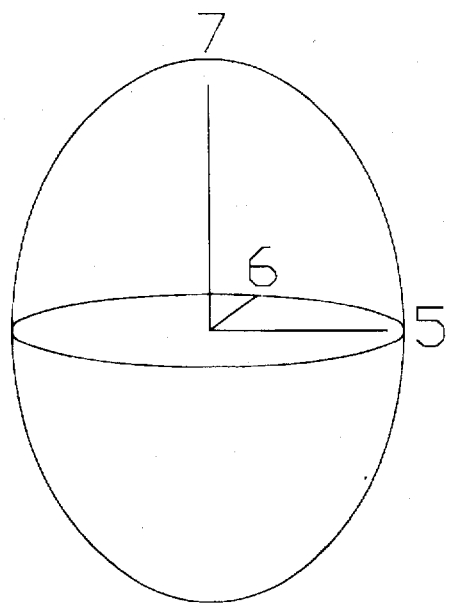

FIG. 4(a) illustrates the three refractive indexes of the optical retardation film of this invention along three different axes. $N_x$ 5 is the refractive index along X axis, $N_y$ 6 is the index along Y axis, and $N_z$ 7 is the index along Z axis. Because the optical retardation film as described above is formed by means of spin-coating, it comprises single axis crystal. The refractive indexes on the XY plane are identical. An elliptic as shown in FIG. 4(b) can be used to represent the characteristics of the phase retarder of this invention. The ordinary index $N_o$ and the extraordinary index $N_e$ can be expressed as $N_o=N_x=N_y$ and $N_e=N_z$ respectively.

The optical retardation film can be made with different thickness by using different spinning speed with the spin coater. The optical path difference introduced by the optical retardation film also depends on the thickness of the retardation film.

Figure 5:
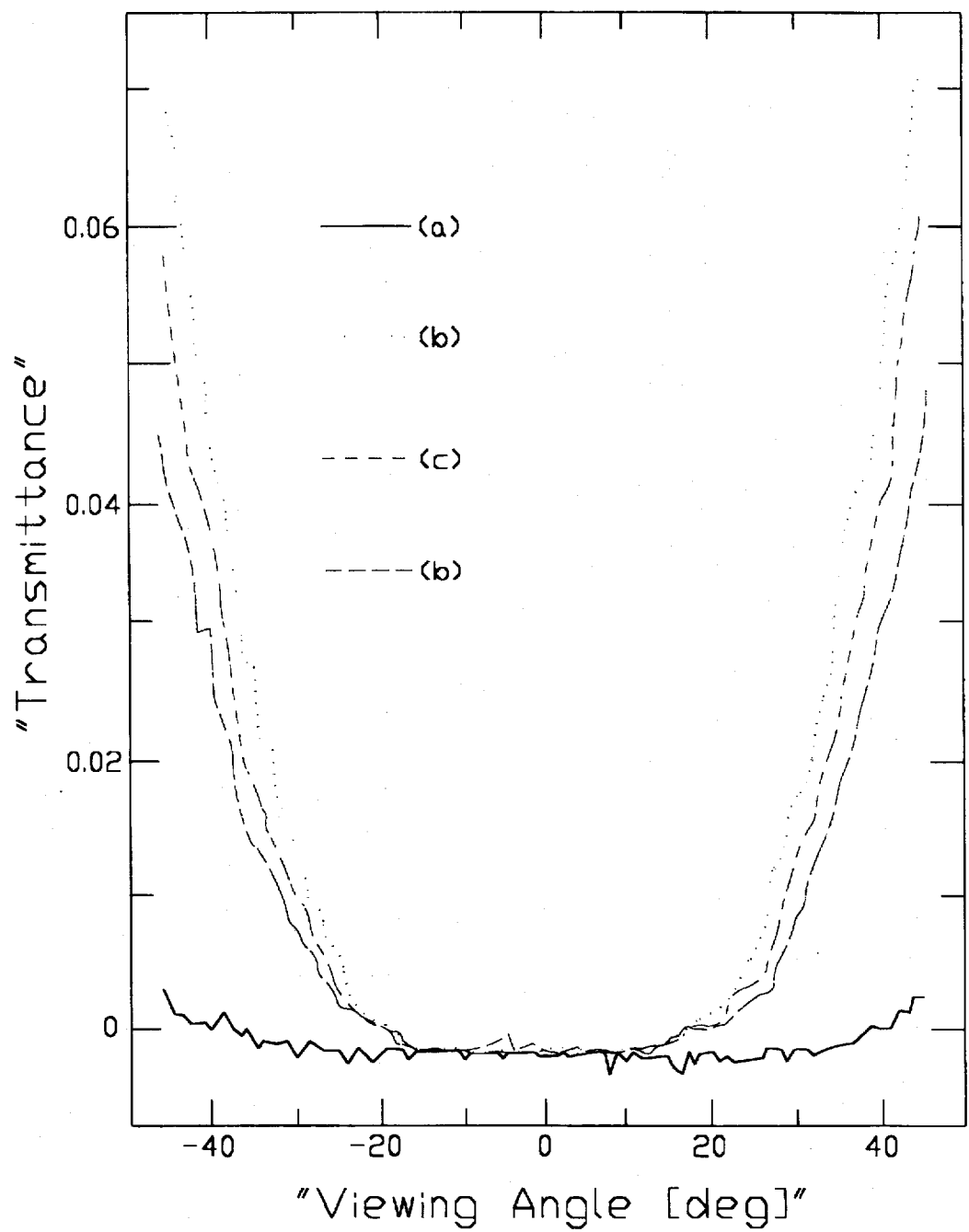
FIG. 5 shows the transmittance measured after inserting the retardation film of this invention between two polarizers having crossed polarization.

FIG. 5 shows the transmittance as a function of viewing angles when a retardation film of the present invention is placed between two polarizers having crossed polarization. In the figure, plot (a) illustrates the transmittance for the case in which the retardation film does not exist. The transmittance is close to a zero value for all different viewing angle. Plots (b), (c), (d) of FIG. 5 show the transmittance for other cases in which the retardation films were made with 500 rpm, 700 rpm, and 900 rpm spinning speed. It can be seen that different spinning speed can produce a retardation film having a specific optical path difference DND, where D is the thickness of the film and DN stands for the difference between the ordinary index and the extraordinary index, i.e. $DN=N_e-N_o$. To improve the contrast ratio and viewing angle of an LCD display, an optical retardation film with appropriate thickness can be selected to fit the design of the LCD display.

Instead of using a separate glass substrate in the process of forming the optical retardation film as described above, the retardation film can also be directly coated on the surface glass of LCD cells. The glass is first cleaned and then coated with an adhesive layer. After the adhesive layer is dried, the retardation film can be coated above the adhesive layer on the surface glass using the spin coating method described earlier. The retardation film is therefore tightly attached to the surface glass of the LCD cells and will not peel off.

By using the optical retardation film of the present invention, the viewing angle of a twisted nematic liquid crystal display (TN-LCD) can be improved dramatically. FIG. 6 shows the transmittance of a TN-LCD in (a) vertical and (b) horizontal directions respectively. The transmittance is measured with or without electrical voltage being applied. From FIG. 6, it can be seen that the viewing angle in the horizontal direction is approximately ±45 degrees. In the vertical direction, the viewing angle is smaller.

FIG. 7 illustrates the transmittance after coating the retardation film directly on the glass surface of LCD cells of the TN-LCD of FIG. 6. Similar to FIG. 6, the figure shows the transmittance with or without electrical voltage being applied. The viewing angles exceed ±50 degrees in both vertical and horizontal directions.

Although only the preferred embodiments of this invention were shown and described in the above description, it is requested that any modification or combination that comes within the spirit of this invention be protected.

What is claimed is:

1. A method of fabricating an optical retardation film comprising the steps of:
   preparing a clean glass substrate;
   preparing an alkyl solvent;
   forming a solution by dissolving a polymer in said alkyl solvent, said polymer comprising at least one member selected from the group consisting of polyvinyl alcohol, polystyrene, polycarbonate and poly methylmethacrylate;
   establishing a coating of said solution over said glass substrate by spin-coating method;
   forming a single axis crystal coating by heating said coated glass substrate and drying said coating of said solution, said single axis crystal coating having identical refractive indexes along two orthogonal axes on a plane parallel to said glass substrate; and
   separating said single axis crystal coating from said glass substrate, said single axis crystal coating forming said retardation film.

2. The method of fabricating an optical retardation film according to claim 1, wherein the concentration of said polymer in said solution is 30 to 90 g of said polymer dissolved in 100 to 300 ml of said alkyl solvent.

3. The method of fabricating an optical retardation film according to claim 1, wherein said spin-coating method has a spinning speed in the range of 600 rpm to 1500 rpm.

4. A method of fabricating an optical retardation film according to claim 1, said retardation film having a thickness in the range of 10 um to 100 um.

5. A method of making a phase retarder on an optical device comprising the steps of:

cleaning the surface of said optical device;

coating an adhesive layer over said optical device surface;

drying said adhesive layer;

preparing an alkyl solvent;

forming a solution by dissolving a polymer in said alkyl solvent, said polymer comprising at least one member selected from the group consisting of polyvinyl alcohol, polystyrene, polycarbonate and poly methylmethacrylate;

establishing a coating of said solution over said optical device by spin-coating method; and forming a single axis crystal coating by drying said coating of said solution, said single axis crystal coating having identical refractive indexes along two orthogonal axes on a plane parallel to said optical device surface and forming said phase retarder.

6. The method of making a phase retarder on an optical device according to claim 5, wherein the concentration of said polymer in said solution is 30 to 90 g of said polymer dissolved in 100 to 300 ml of said alkyl solvent.

7. The method of making a phase retarder on an optical device according to claim 5, wherein said spin-coating method has a spinning speed in the range of 600 rpm to 1500 rpm.

8. The method of making a phase retarder on an optical device according to claim 5, wherein said phase retarder has a thickness in the range of 10 um to 100 um.

9. A method of making an optical retardation film on LCD cells of an LCD display comprising the steps of:

cleaning the surface of said LCD cells;

coating an adhesive layer over said surface;

drying said adhesive layer;

preparing an alkyl solvent;

forming a solution by dissolving a polymer in said alkyl solvent, said polymer comprising at least one member selected from the group consisting of polyvinyl alcohol, polystyrene, polycarbonate and poly methylmethacrylate;

establishing a coating of said solution over said LCD cells by spin-coating method; and forming a single axis crystal coating by drying said coating of said solution, said single axis crystal coating having identical refractive indexes along two orthogonal axes on a plane parallel to the surface of said LCD cells and forming said optical retardation film.

10. The method of fabricating an optical retardation film on LCD cells of an LCD display according to claim 9, wherein the concentration of said polymer in said solution is 30 to 90 g of said polymer dissolved in 100 to 300 ml of said alkyl solvent.

11. The method of fabricating an optical retardation film on LCD cells of an LCD display according to claim 9, wherein said spin-coating method has a spinning speed in the range of 600 rpm to 1500 rpm.

12. The method of fabricating an optical retardation film on LCD cells of an LCD display according to claim 9, wherein said optical retardation film has a thickness in the range of 10 um to 100 um.

* * * * *